No. 730,965. PATENTED JUNE 16, 1903.
W. G. RANDALL.
OCULAR CAMERA.
APPLICATION FILED NOV. 6, 1902.
NO MODEL.
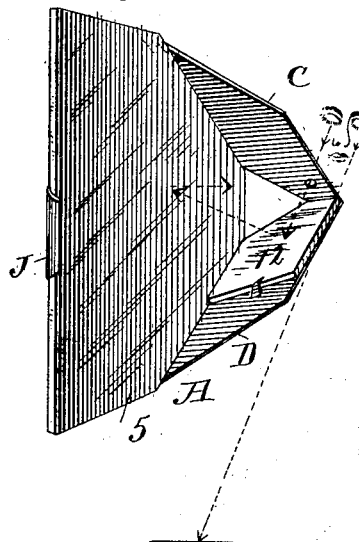
Fig. 1.
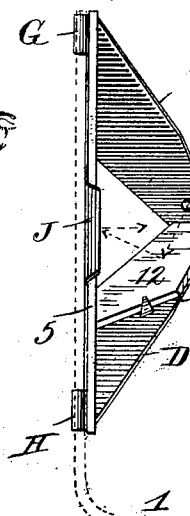
Fig. 2.
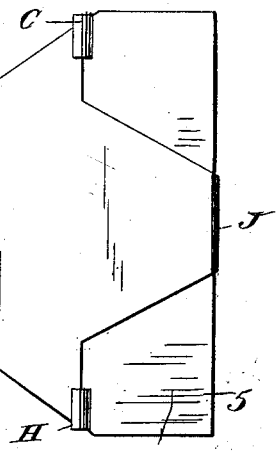
Fig. 3.
Fig. 8
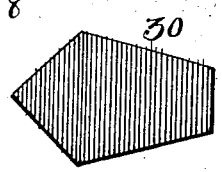
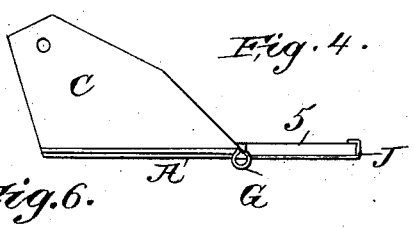
Fig. 4.
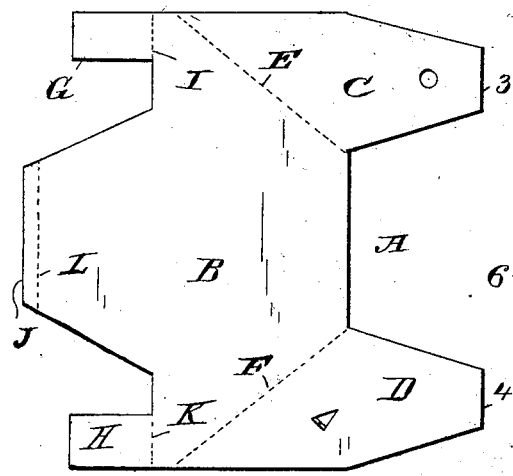
Fig. 5.
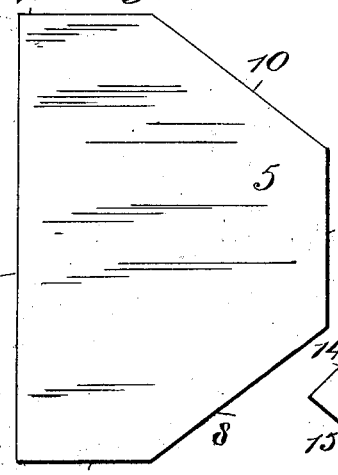
Fig. 6.
Fig. 7.
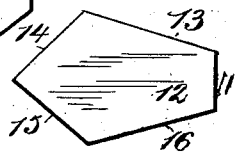
Fig. 9
WITNESSES:
C. W. Benjamin
Chas. G. Hensley
INVENTOR
Wm. G. Randall
BY O. Ellery Edwards Jun
ATTORNEY.
THE NORRIS PETERS CO., PHOTO-LITHO., WASHINGTON, D. C.

No. 730,965. Patented June 16, 1903.

UNITED STATES PATENT OFFICE.

WILLIAM G. RANDALL, OF GREENSBORO, NORTH CAROLINA, ASSIGNOR OF TWENTY-FIVE ONE-HUNDREDTHS TO O. ELLERY EDWARDS, JR., OF NEW YORK, N. Y.

OCULAR CAMERA.

SPECIFICATION forming part of Letters Patent No. 730,965, dated June 16, 1903.

Application filed November 6, 1902. Serial No. 130,236. (No model.)

*To all whom it may concern:*

Be it known that I, WILLIAM G. RANDALL, a citizen of the United States, and a resident of Greensboro, county of Guilford, and State of North Carolina, have invented a new and useful Ocular Camera, of which the following is a description, such as will enable those skilled in the art to make and use the same.

The object of my invention is to produce an instrument that will accomplish everything that can be done by the camera lucida and certain other objects which will be hereinafter described.

In the ordinary form of the camera lucida a prism is employed which bends a ray of light twice, so as to throw the image of an object into the eye of the operator, and with the same eye the operator looks through a portion of the prism and seems to see the image of the object on a surface, so that the operator may trace the image on a sheet of paper or other material. The disadvantages of this instrument are that it is expensive to manufacture, as the prism must be carefully ground and accurately made, and a great deal of light is absorbed in transmission, because of the thickness of the glass necessarily employed. Furthermore, as the reflecting-surfaces are necessarily small the size of a drawing which may be made is necessarily limited. These objections I entirely overcome by providing two mirrors, one of which may be vertical and as large as desired, and the second is held at an angle approximating sixty degrees to the first mirror and at an angle of about forty-five degrees to a horizontal plane, and above this second and smaller mirror is an opaque covering provided with a perforation through which the image of an object is borne into the eye of the operator, the image first being projected against the larger mirror and then against the smaller and thence through said perforation, as described above. The other eye of the operator is entirely free from the instrument and looks at the horizontal surface below, so that when one eye sees the image borne by the mirrors the other eye sees a surface, and the effect is an optical illusion, so that the operator appears to see an image on a surface, and it is obvious that he may trace the object on the surface just as with a camera lucida. As little or no light is absorbed by these mirrors, I have sometimes found it necessary to use a black instead of a silver glass, so as to reduce the intensity of the light, or I may both reduce and color the light by using a colored instead of a silvered mirror.

For a more detailed description of an embodiment of my invention reference is had to the accompanying drawings, forming part of this specification, in which—

Figure 1 is a perspective view of the ocular camera with the eyes of the operator and the direction of the rays being indicated diagrammatically. Fig. 2 is an end view of the same with the support indicated in dotted lines. Fig. 3 is a rear elevation of the same, and Fig. 4 is a plan view. Fig. 5 is the blank of the frame, and Figs. 6 and 7 are views of the larger and smaller mirrors. Figs. 8 and 9 are detailed views showing red and black mirrors, respectively.

The same reference characters indicate the same parts throughout the various views.

The blank A, which forms the frame, consists of the flattened portion B, provided with ears C and D, which are bent on the crease-lines E and F, respectively, and the projections G and H, which are adapted to be bent into a cylindrical form, as shown in Fig. 4, to hold the frame to the support 1. Between the projections G and H is a projection I, with a crease-line at L to secure the larger mirror in place. At N in the ear D is a tongue which is adapted to be bent to hold the smaller mirror, all of which will be described below, and M is a perforation in the ear C. The ears C and D are so shaped that they may be bent at an angle of sixty degrees to the portion B along the lines E and F and are united at the edges 3 and 4. They are held in such a position that when the plane B is vertical the ears C and D will be at an angle of forty-five degrees to a horizontal plane. These ears are made as small as convenient and shaped substantially as shown, so as not to interfere with the free eye of the operator. This blank may be made of an opaque sheet of material, sheet metal being preferred.

5 is the larger mirror and is preferably formed with sides 6, 7, 8, 9, 10, and 11 of the shape shown in Fig. 6, and 12 is the smaller mirror, which is preferably provided with five sides 13 14 15 16 17 and is substantially keystone in shape. These mirrors may be of any desired kind, although I find that common silvered mirrors answer every purpose, except as hereinafter stated. The mirror 5 is made to fit between the lines E, F, and L of the blank A, and the mirror 12 rests on the ear D against the mirror 5, the tongue N, and the ears C. To secure the mirrors in place, the tongues I and N are bent, as indicated in Figs. 1 and 2. When it is desired to change the color of the image thrown into the eye, the smaller mirror 12 may be replaced by the colored mirror 30. (Shown in Fig. 8.) This mirror may be of any desired color, although red is shown in the drawings, and when used it will not only color the image thrown into the eye, but it will also reduce the intensity of the light thrown in. When it is desired to reduce the intensity light without discoloring the image thrown into the eye, the black mirror 31 (shown in Fig. 9) may be substituted for the mirror 12.

The rod 1, which passes through the cylinders formed by the projections G and H, may be clamped to any support, although it is preferred to secure it to the horizontal surface on which the sketch is made. As the smaller mirror is at an angle of forty-five degrees to this surface, it is evident that rays of light are reflected through the perforation M in a line substantially perpendicular to said surface.

It is evident that an ocular camera is adjusted much as a camera lucida—that is, the size of the image which appears on the horizontal surface depends upon the distance from the surface to the instrument and also upon the distance between the instrument and the object reflected. By varying either or both of these distances the size of the image to be sketched may be varied at the volition of the operator.

Having thus shown and described one embodiment of my invention, what I claim is—

1. In an ocular camera or similar instrument, means for throwing the image of an object into an eye of an operator, means for coloring the said image, and means for preventing said eye from seeing anything but said colored image, so that, when the instrument is in use, one eye of the operator sees the image, while the other eye sees a surface whereby an optical illusion is produced so that the colored image appears on the surface.

2. In an ocular camera or similar instrument, means for throwing the image of an object into an eye of an operator, means for reducing the illumination of said image, means for preventing said eye from seeing anything but said image, so that, when the said instrument is in use, one eye of the operator sees the image, while the other eye sees a surface whereby an optical illusion is produced so that the object appears on the surface with reduced brilliancy.

3. In an ocular camera or similar instrument, a frame, two mirrors held in said frame with a dihedral angle of about sixty degrees, one of said mirrors being covered by an opaque and perforated portion of said frame, so that an eye of the operator may view a mirror through the frame.

4. In an ocular camera or similar instrument, a frame, two mirrors held so that their reflecting-surfaces have a dihedral angle of about sixty degrees, one of said mirrors being smaller than the other mirror and covered by a perforated portion of said frame through which the smaller mirror may be viewed by the eye of the operator.

5. In an ocular camera or similar instrument, a frame with a perforation, two mirrors so combined in said frame that the rays of light emanating from the object are bent so as to pass through the perforation.

6. In an ocular camera or similar instrument, a frame provided with a perforation, mirrors in said frame arranged so that the rays of light emanating from an object are bent in different planes so as to pass through said perforation.

7. In an ocular camera or similar instrument, a frame provided with a perforation, mirrors in said frame arranged so that rays of light emanating from an object are at substantially right angles and in different planes and pass through said perforation.

8. In an ocular camera or similar instrument, a frame with a perforation, mirrors held in said frame arranged so that rays of light emanating from an object are twice bent at right angles to pass through said perforations, the second time said ray is bent into a line substantially normal to the plane determined by the direction of the rays, before and after the first bending.

9. In an ocular camera or similar instrument, a frame, mirrors held in said frame so that one of said mirrors is vertical and the other forms an angle of sixty degrees to the said vertical mirror and forty-five degrees to a horizontal plane, and a perforated and opaque portion of said frame over said second-mentioned mirror, so that the image of an object is thrown by mirrors in a line substantially perpendicular to said horizontal plane.

10. As an article of manufacture, a frame having a flat portion provided with two ears which are secured together, and one of said ears is bent at an angle of approximately sixty degrees to the said flattened portion.

11. As an article of manufacture, a frame, having a flat portion provided with two ears which are secured together, one of said ears being provided with a perforation, and the other of said ears being provided with means to secure a mirror.

12. As an article of manufacture, a frame consisting of a flat portion, having two ears which are secured together, one of said ears being provided with a perforation, and the other with a tongue adapted to secure a mirror, and a tongue on said flat portion which secures a second mirror.

13. As an article of manufacture, a frame having a flat portion provided with two ears, means on one of said mirrors for securing a mirror, means on said flattened portion for securing a mirror, and means on said flattened portion for engaging a support.

14. In an ocular camera, a frame having a flattened portion, projecting ears secured together, mirrors on said flattened portion and one of said ears, and means for rendering one of said mirrors visible through said frame.

15. In an ocular camera, a frame provided with a flattened portion, and two projecting ears which are secured together, mirrors on said flattened portion and one of said ears, one of said mirrors being adapted to absorb light.

16. In an ocular camera or similar instrument, a frame provided with a flattened portion and two projecting and united ears, mirrors on said flattened portion, and one of said ears, one of said mirrors being adapted to color the image reflected by said mirrors.

17. In an ocular camera or similar instrument, a frame having a flattened portion, and two projecting, united and reduced ears, and mirrors on said flattened portion and one of said ears.

18. In an ocular camera or similar instrument, a vertical mirror with converging edges, a smaller mirror held in an angle of sixty degrees with said vertical mirror, and at an angle of forty-five degrees with a horizontal plane, and a perforated diaphragm over said smaller mirror through which the image of an object is projected.

19. As an article of manufacture, a blank for the frame of an ocular camera comprising the flattened portion B, ears C and D, and creases E and F.

20. As an article of manufacture, a blank for a frame of an ocular camera, comprising a flattened portion B, perforated ear C, an ear D, creases E and F, and a tongue in said ear E.

21. As an article of manufacture, a blank for a frame of an ocular camera comprising a flattened portion B, ears C and D, creases E and F, projections G, H and I, and creases J, K and L.

22. In an ocular camera or similar instrument, means for throwing the image of an object into an eye of an operator, and means for preventing said eye from seeing anything but said image, so that when the said instrument is in use, one eye of the operator sees the image while the other eye sees a surface whereby an optical illusion is produced so that the object appears on the surface.

Signed at the city of Greensboro, county of Guilford, and State of North Carolina, this 3d day of November, 1902.

WILLIAM G. RANDALL.

Witnesses:
 CHARLES D. McIVER,
 GEO. A. GRIMSLEY.